July 5, 1927.

W. F. SMITH 1,634,728

AGRICULTURAL IMPLEMENT

Filed Dec. 17, 1921

4 Sheets-Sheet 2

Inventor
William F. Smith
By his Attorney

July 5, 1927.

W. F. SMITH

AGRICULTURAL IMPLEMENT

Filed Dec. 17, 1921

1,634,728

4 Sheets-Sheet 3

Inventor
William F. Smith
By his Attorney

July 5, 1927.

W. F. SMITH 1,634,728

AGRICULTURAL IMPLEMENT

Filed Dec. 17, 1921

4 Sheets-Sheet 4

Inventor
William F. Smith
By his Attorney

Patented July 5, 1927.

1,634,728

UNITED STATES PATENT OFFICE.

WILLIAM F. SMITH, OF BROOKLYN, NEW YORK, ASSIGNOR OF ONE-HALF TO HERMAN A. SCHATZ, OF POUGHKEEPSIE, NEW YORK.

AGRICULTURAL IMPLEMENT.

Application filed December 17, 1921. Serial No. 523,135.

This invention relates to agricultural implements and particularly to such implements propelled by tractors.

It is the object of the present invention to provide an implement of simple and strong construction, and one which is readily adjustable to various conditions of the work.

According to one of the features of the present invention, the motor drive of a tractor is utilized for lowering and raising the attached implement. In addition to the motor controlled means, independent manually operable means are provided for the raising and lowering of the implement.

This and other features of the invention will be more clearly understood from the following description and the drawings exemplifying a preferred embodiment of the invention. However, the scope of the present invention is not limited to the particular structure disclosed. Various modifications will obviously appear to those skilled in the art without departing from the spirit of the invention defined in the claims. Preferably, the plough constructed in accordance with the present invention is operated in conjunction with a tractor like the one disclosed in by copending application Ser. No. 520,703, filed December 7, 1921.

Figure 1:
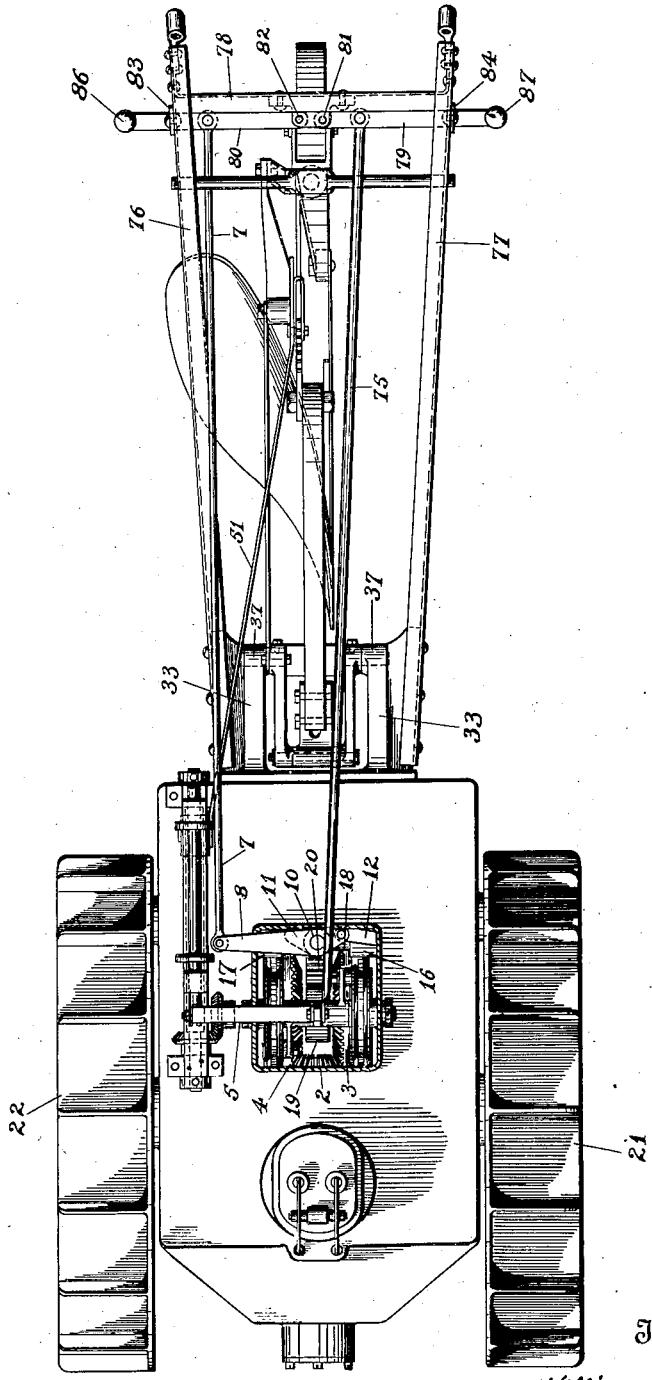
Figure 2:
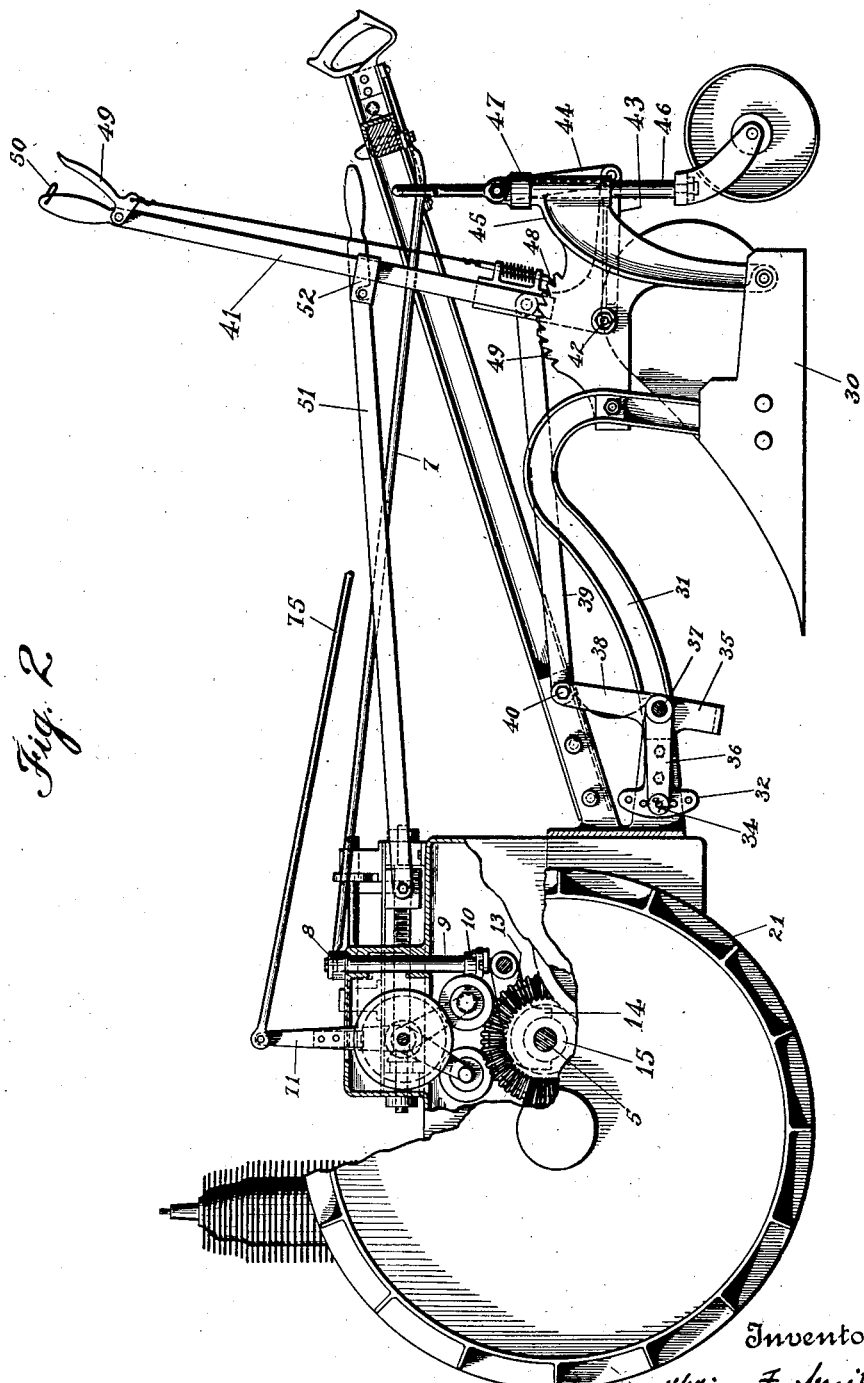
Figure 3:
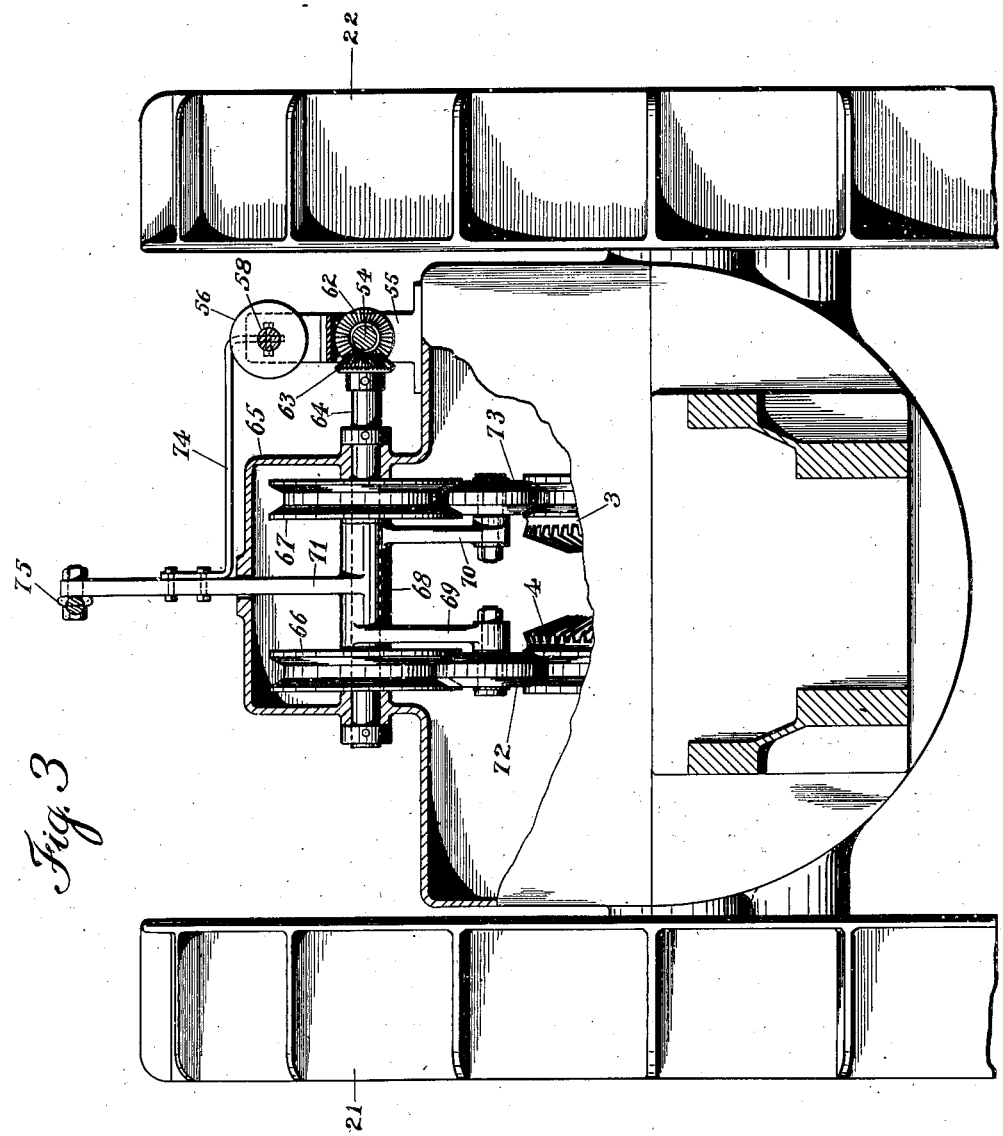
Figure 4:
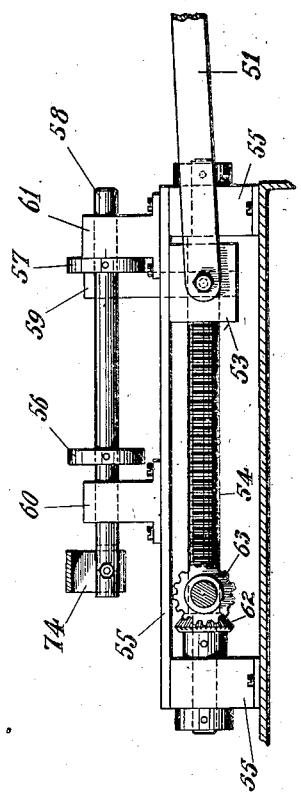
Figure 6:
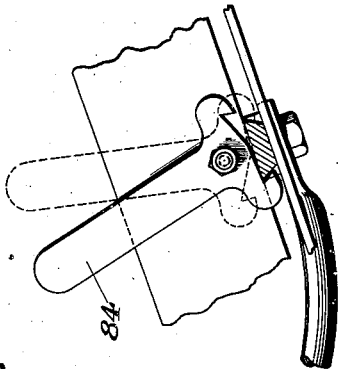
Figure 5:
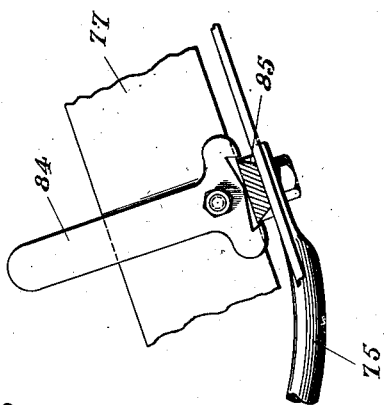

In the drawings, Fig. 1 is a top plan view of a plough hitched to a tractor; Fig. 2 is a sectional side view of the plough lift control; Fig. 3 is a front view of the plough lift control; Fig. 4 is a detail view of the plough lift control; Figs. 5 and 6 are detail views of the combination lock and stop for the plough lift and clutch control levers.

The tractor used in conjunction with a plough constructed in accordance with the present invention may be of any well-known type. It will be provided with the usual internal combustion engine which, through a suitable shaft rotates a bevelled gear 2 intermeshing with the toothed surface of gear wheels 3 and 4 of the transmission, and is adapted to rotate these gear wheels in opposite directions.

The gear wheels 3 and 4 are mounted freely to rotate around a transmission shaft 5. By means of suitable clutches, the motion of wheels 3 and 4, respectively, may be transmitted to the shaft 5 to cause its forward or backward rotation. The actuation of the clutches is controlled by a rod 7 which may be moved towards or away from the operator. The movement of rod 7 is transmitted to a lever 8, one end of which is pivotedly secured to rod 7. The other end of lever 8 is pinned to a shaft 9, and the lower end of this shaft is secured in a hub 10 of a centrally pivoted triangular piece 11, the rocking of which is in turn transmitted to connecting links, one of which is shown at 12. The connecting links are connected with the respective clutches through arms, one of which is shown at 13, carrying at their free ends yokes, such as 14 engaging the grooves of collars such as 15 the horizontal displacement of which results in the actuation of the clutches. The arms 13 are integral with the sleeves 16 and 17 slidably mounted on a shaft 18.

The rotation of shaft 5 is transmitted by a pinion gear 19 keyed thereto, to a gear wheel 20 through which a differential gearing (not shown) is actuated to drive the tractor-wheels 21 and 22.

The plough 30 is connected to the rear of the tractor through a suitably shaped beam 31, the free end of which terminates in a clevis 32. The clevis 32 is connected by means of a pin 34 to the free ends of a cradle formed by a yoke 35 and two arms 36. The cradle is pivoted between two arms 33 by means of a pin 37 upon which the cradle may be rocked. An upwardly projecting lever 38 of one of the arms 36 has its free end connected with one end of a lever 39 by pivot 40. The other end of lever 39 is pivoted to the lower part of a plough control lever 41. The lever 41 is rotatable around a pivot 42, and with its projection 43 may actuate a connecting link 44 vertically to displace a frame 45. A shaft 46 is slidably mounted in a bearing 47 of frame 45 on which the plough is supported. By means of a spring pressed pawl 48 cooperating with a rack 49 of frame 45, the lever 41 may be maintained in any desired position. The pawl 48 is actuated under the control of a handle 49 pivoted on the lever near its grip end. A ring 50 serves to hold the handle 49 when it is desired permanently to remove pawl 48 from engagement with the rack.

A rod 51 may be fastened at one end to control lever 41 by means of a clamp 52. The other end of this rod is pivoted to a screw block 53 mounted on and cooperating with a screw 54 rotatably mounted on the casing of the tractor within a frame 55. The top surface of the screw block 53 engages the upper bar of frame 55 and thereby prevents the rotation of the block with the screw. Stops 56 and 57 provided on a horizontally movable rod 58 may be actuated by finger 59 on the screw block 53, and the displacement of the rod 58 is in turn limited by the stops engaging the bearing blocks 60 and 61 of the frame 55, the rod 58 being slidably mounted in these bearing blocks.

The screw 54 may be rotated by means of a bevelled gear 62 mounted thereon and co-operating with a bevelled gear 63 in which a shaft 64 journaled in a housing 65 of the tractor casing terminates. The shaft 64 carries two friction wheels 66 and 67 each having a substantially V shaped groove around its perihpery. Between wheels 66 and 67, a collar 68 is loosely mounted on shaft 64, and projecting from this collar are three spirally arranged levers, 69, 70 and 71. Discs 72 and 73 are rotatably mounted on the free ends of levers 69 and 70, respectively. The periphery of these discs has an inverted V shape registering with the grooves in wheels 66 and 67 and also with V shaped grooves around the gear wheels 4 and 3 of the transmission. The discs 72 and 73 are normally out of engagement with the grooved wheels but when actuated, will transmit the motion of gear wheel 4 or 3 to the wheels 66 or 67 and thus to the shaft 64. One end of a rod 74 is secured to the lever 71, and the other end to guide rod 58. The free end of lever 71 has pivoted thereto a rod 75.

The operator guides the tractor by means of the handle bars 76 and 77 fastened to the rear of the tractor and held together by a brace 78. Two levers 79 and 80 are pivoted to the brace 78 at 81 and 82, and pivoted to these levers, respectively, are the free ends of rods 75 and 7. Pivoted to bars 76 and 77 are the combination locks and stops 83 and 84 each arranged to engage a bevelled portion like 85, (Fig. 5) provided on levers 79 and 80. The construction of 84 and 83 makes it possible for the rod 75 and 7 to be drawn towards the operator only when the locks and stops are in the position indicated in full lines in Fig. 6, and pushed away from the operator only when the locks and stops are in the position indicated in dotted lines, and when the locks and stops are in the position shown in Fig. 5 the rods 75 and 7 cannot be moved.

The motor is started in the well-known manner and causes the rotation of gear wheels 3 and 4 through the agency of the gear 2, wheel 3 rotating in a clockwise and wheel 4 in a counterclockwise direction.

If the operator desires to drive in a forward direction, he will tilt the combination lock and stop 83 into the position illustrated in dotted lines in Fig. 6 and then grasp the handle 86 and push it forward. This rotates the lever 80 in a counterclockwise direction, whereby the rod 7 is pushed away from the operator. The bar 7 pushes the lever 8 with it, and the latter in turn rotates the triangular piece 11 in a counterclockwise direction. If the operator desires to move the tractor backward, he must rotate the lever 80, in the opposite direction, which, due to the engagement of bevelled portion 85 on the lever 80 by the lock and stop 83, cannot be done until the lock and stop 83 is moved into the position shown in full lines in Fig 6. Through the bell-crank connections 7 and 8, the triangular piece 11 is rotated in a direction opposite to the one in the previous case when the bar 7 was pushed away from the operator.

In response to the first mentioned rotation of the piece 11 the movement of gear 4, and in response to the second mentioned rotation of piece 11, the movement of gear 3 is transmitted to the shaft 5 and then to the differential for causing the forward or backward rotation of the tractor wheels.

If the operator desires to lower the plough manually, he first disengages the rod 51 from the clamp 52, and grasping the handle of lever 41 and the handle 49, rotates lever 41 in a counterclockwise direction around its pivot 42, the pawl 48 being all the time held out of engagement with the rack 49. The lever 41 pushes the rod 39 forward and through the agency of the bell-crank connection formed by 39 and 38, the cradle 35—36 is rotated around pins 37 in a counterclockwise direction. This motion is transmitted to the plough 30 through the clevis 32 and beam 31 with the result that the nose of the plough will be lowered.

At the same time the arm 43, due to the pressure exerted upon the connecting link 44, presses the bearing 47 downward or away from the handle bars 76 and 77, with the result that, the frame 45 is moved downward and carries the heel of the plough with it.

The plough 30 may be raised by rotating the lever 41 in the opposite direction.

If it is desired to raise or lower the plough under the control of the motive power of the tractor, the ring 50 is placed over the handle 49 permanently retracting the pawl 48. The lever 41 is now free to rotate forward or backward. Furthermore, the rod 51 is secured to the lever 41 by means of the clamp 52.

The other end of rod 7 being attached to the screw block 53, the traveling of this block is translated into a forward or backward rotation of the lever 41 with the above described results. The block 53 may be operated by means of the motor 1 in accordance with the pushing forward or drawing backward of the rod 75.

If it is desired to raise the plough 30, the operator pulls toward him the lever 79 by means of handle 87, after having thrown the combination lock and stop 84 into the position shown in full lines in Fig. 6. The bar 79 pulls the rod 75 toward the operator, and this rod rotates the lever 71 in a manner to move friction disc 72 between gear 4 and wheel 66, and the disc 73 away from gear 3 and wheel 67. The rotation of gear 4 is, therefore, transmitted through disc 72 to wheel 66 and the latter rotates the shaft 64, and bevelled gear 63 carried thereby in a counterclockwise direction.

The opposite effect is attained if the bar 75 is pushed away from the operator. The friction disc 73 will now transmit the rotation of gear 3 to wheel 67. The gear 63 is now rotated in a direction opposite to the one resulting from the actuation of disc 72.

The rotation of gear 63 is transmitted through gear 62 to the screw threaded shaft 54, whereby the block 53 is caused to travel between stops 56 and 57 to move the rod 51 forward or backward. When the block 53 is nearing the limit of its movement, the finger 59 engages the stop 56 and pushes it against 60. The bar 58 is displaced from right to left (Fig. 4) and moves arm 74 to rock the lever 71 backward (Fig. 3). This removes the friction disc 72 from between gear 4 and wheel 66, and the power transmission to screw 54 ceases. At the same time, the lever 71 pulls the rod 75 and lever 79 away from the operator until lever 79 is stopped by the combination lock and stop 84.

When the guide rod 58 is moved in a right-hand direction due to the stop 57 being forced against 61 (this will occur when block 5 is in its extreme right-hand position), the arm 74 causes the rocking of lever 71 in the opposite direction. In this case, the disc 73 will be moved from its actuated into its normal position, and the rod 75 and lever 79 pushed toward the operator until arrested by the combination lock and stop 84.

Due to this arrangement of the stop mechanism, the raising or lowering of the plough is restricted between definite limits and mistakes by the operator are automatically guarded against.

What I claim is:—

1. In a vehicle, a motor for driving the vehicle, an agricultural implement mounted on a beam, a journaled connection between said vehicle and beam, a manually rotatable lever supported by the beam, means responsive to rotation of said lever for simultaneously raising the ends of said beam connected to the vehicle and said implement, a bar adapted to be detachably connected to the said rotatable lever, and means operated by the motor for reciprocating the bar and thereby rotating the said lever.

2. In a vehicle, a motor for driving said vehicle, a plough hitched to said vehicle, a manually rotatable lever, means responsive to the rotation of said lever for simultaneously raising the heel and nose of said plough, a bar, means to detachably connect the bar to the rotatable lever, and means operated by the motor for reciprocating the bar and thereby rotating the said lever.

3. In combination, an agricultural implement, a tractor therefor having a motor driven transmission, two friction discs spirally displaced relative to a common support, a device adapted to travel between two points for raising and lowering said implement, a wheel for driving said device in one and another wheel for driving it in opposite direction, and means operable at will for rocking said common support to place one or the other friction disc between the transmission and one or the other of said wheels.

4. In combination, an agricultural implement, a tractor therefor having a motor driven transmission, two friction discs spirally displaced relative to a common support, a device adapted to travel between two points for raising and lowering said implement, stops for limiting said travel, a wheel for driving said device in one and another wheel for driving it in the opposite direction, means operable at will for rocking said common support to place one or the other friction disc between the transmission and one or the other of said wheels, and means operative upon the actuation of a stop for rocking said common support to remove a friction disc from between the transmission and one of said wheels.

5. In combination, an agricultural implement, a tractor having a motor driven transmission shaft and two wheels, two oppositely rotating gear wheels on said shaft, a second shaft, a bevelled gear and two friction wheels secured to said second shaft, a freely rotating collar mounted on said second shaft, two spirally displaced levers projecting from said collar, a freely rotating friction disc carried by each one of said levers, a screw threaded shaft having a cooperating screw block, means controlled by the bevelled gear for rotating said screw threaded shaft, means responsive to the traveling of said screw block in one direction for raising said implement, means responsive to the traveling of said screw block in the opposite direction for lowering said implement, means operable at will for rotating said collar in one direction to move one disc into engagement with a friction and a gear wheel and in the opposite direction for moving the other disc into engagement with the other friction and other gear wheel, movable stops for limiting the displacement of said screw block, a lever controlling said collar actuated by said stops, and means for raising and lowering said implement independently of said gear wheels.

6. In combination, a vehicle, a plough, a vertically operable pivoted connection between said vehicle and plough, a wheel supported by a vertical shaft, a bearing within which said shaft is slidably supported attached to said plough, a controlling lever journaled on a pin supported by the plough, and means to operably interlink the lever and the said vertical shaft whereby the shaft may be displaced longitudinally, said pivoted connection comprising a bell crank journaled on the vehicle, the bell crank having an operable connection to the said lever.

In testimony whereof, I, WILLIAM F. SMITH have signed my name to this specification, this 16th day of December, 1921.

WILLIAM F. SMITH.